2 Sheets--Sheet 1.

F. E. SICKELS.

Mode of Steering Vessels.

No. 6,068. Reissued Sept. 29, 1874.

Witnesses.
S. M. Pool
Edmund Masson

Inventor.
Frederick E. Sickels.
By Atty A. B. Stoughton.

THE GRAPHIC CO. PHOTO-LITH. 39 & 41 PARK PLACE, N.Y.

F. E. SICKELS.

Mode of Steering Vessels.

No. 6,068. Reissued Sept. 29, 1874.

*Witnesses.*

S. M. Pool

Edmund Masson.

*Inventor:*

Frederick E. Sickels.

By Atty. A. B. Stoughton.

THE GRAPHIC CO. PHOTO-LITH. 39 & 41 PARK PLACE, N.Y.

UNITED STATES PATENT OFFICE.

FREDERICK ELLSWORTH SICKELS, OF SWARTHMORE, PENNSYLVANIA.

IMPROVEMENT IN MODES OF STEERING VESSELS.

Specification forming part of Letters Patent No. 29,200, dated July 17, 1860; application filed July 2, 1849; extended seven years; reissue No. 6,068, dated September 29, 1874; application filed September 17, 1874.

*To all whom it may concern:*

Be it known that I, FREDERICK ELLSWORTH SICKELS, formerly of the city, county, and State of New York, now residing at Swarthmore, in the county of Delaware and State of Pennsylvania, have invented a new and useful Mode of Steering Vessels; and that the following is a full, clear, and exact description of the same.

There are various contrivances now in use for controlling and operating the rudders of vessels, the intention being to create such a leverage that a person or persons will have sufficient power to work the rudder.

The principle and character of my invention consist, first, in bringing to the aid of the steersman the power of steam so arranged as to alternately move and hold the rudder of the vessel in any required position, according to the action of the steersman; and my invention further consists in the combination of a steam steering-engine, a hand steering-gear, and a connecting and disconnecting mechanism, so that either the said engine or gear can be used with the rudder, as may be required; and my invention finally consists in the combination of a steam steering-engine and a hand steering-gear with a brake, to assist in holding the rudder, as may be required.

Figure 1:
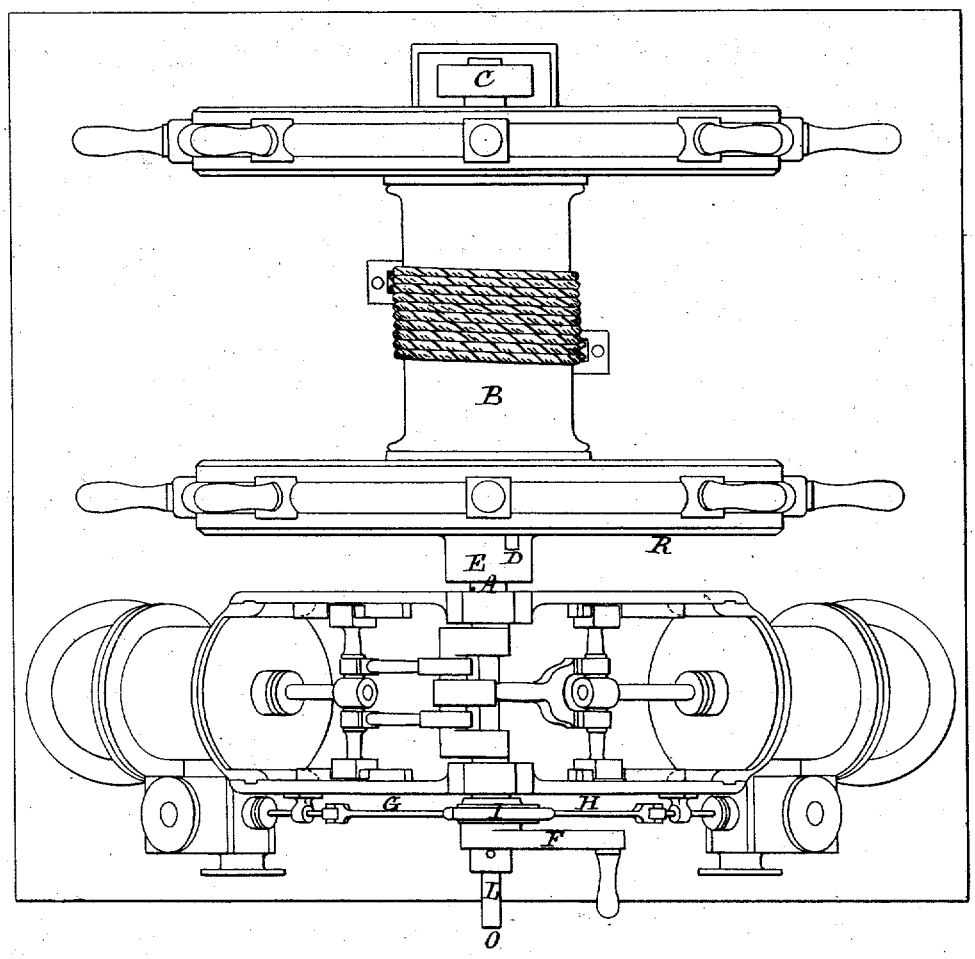
Figure 2:
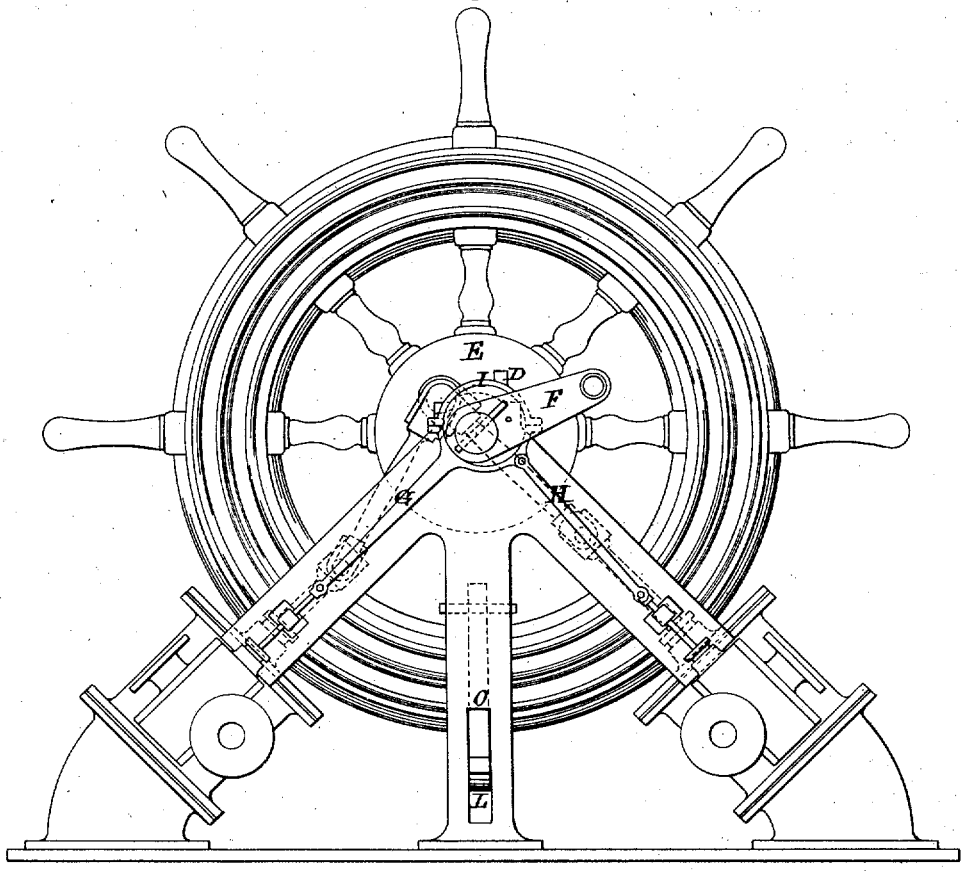
Figure 3:
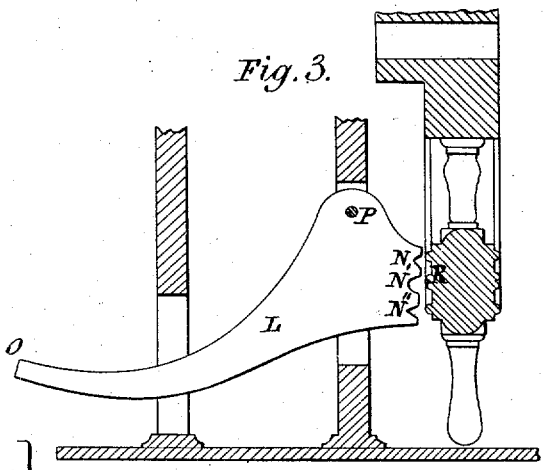

Figure 1 is a side view, and Fig. 2 is a top view, of two common high-pressure steam-engines of the ordinary construction, and, as shown in the drawing, geared at right angles, and made to drive around the common shaft A, (the same letters refer to the same parts in each figure,) which shaft passes through an ordinary steering-wheel, B, and terminates in a bearing, C. D is a key, which passes through the hub E, which is permanently fast to the steering-wheel B. This key D also passes through one side of the shaft A, thus connecting the steering-wheel B with the driving-shaft A of the engines. L is a lever friction-brake, shown in Figs. 1 and 2 attached in its place, and in Fig. 3 separate therefrom. This brake has a bearing in the upright of the engine nearest the steering-wheel, and will act by means of grooves N N′ N″, (shown in Fig. 3,) pressing upon corresponding beads on the side R of the steering-wheel when the lever is pressed upon at O, it turning upon a pin, P. The crank F is fastened to the eccentric I, which operates the D slide-valves of both engines by means of the connections G H leading to them, respectively, and the steersman, by turning around the crank F, causes the steam-engines to turn round in the same direction, and with the same number of revolutions; for, the application of power depending upon the turning and holding, by the steersman, of the crank F, the engines must move correspondingly, provided they have sufficient power to hold and move the rudder as required, they being properly connected with the boiler furnishing the steam.

After the steersman has opened the valve to either engine, the piston of that engine may move to the end of the cylinder, producing a motion in advance of the action of the steersman, but that advanced motion cannot continue without, in doing so, causing the piston to encounter the steam which pressed it forward, and without steam on the other side to aid its motion, and this resistance would act, as occasion required, to hold or move the rudder agreeably to the action of the steersman.

It is evident that the application of steam, as here explained, to operate rudders, may be made more or less direct, and variously arranged and located; as, for instance, the driving-shaft A of the engine may drive a pinion, which may gear into a wheel attached to the steering-wheel, or attached directly to the tiller or stock of the rudder, and, suitable pipes being connected, the admission and exhaustion of steam may be made by any valve or cock, or other device operated by the steersman, so arranged as to apply or reverse its action; and it is evident that any greater or less amount of machinery between the first action of the steam and the final application of the power derived therefrom to the rudder may be made to suit the convenience of the various cases that arise in practice; and it is also evident that in applying steam it may be used in connection with any method of operating the rudder; for instance, as in the drawing, it is shown in combination with an ordinary steering-wheel, and by removing the key D the steering-wheel will be entirely independent of the action of steam, and could be worked in the ordinary way; or, if a cog-wheel and pinion were used, a clutch could be thrown out to disconnect the engine from the steering-wheel, or any other device for readily and instantly disconnecting machinery could be used, so that in case it was required at any time, either from accident to any part of the machinery or from a desire not to use the steam except in case of emergencies, or from other cause, the means will have been provided for disconnecting the steam-engine from any steering apparatus in combination with which it may be used, it being important to select the plan that would involve the least amount of machinery with the greatest facilities in practice. It is also evident that the power furnished by steam will enable the steersman to control an increased size rudder.

Having thus fully explained the nature and character of my invention, what I claim as new, and desire to secure by Letters Patent, is—

1. The combination of the rudder of a vessel with machinery to cause the power of steam, in connection with the action of the steersman, to alternately move and hold the rudder.

2. The combination of a steam steering-engine, a hand steering-gear, and connecting and disconnecting mechanism, so that either the said engine or gear can be used with the rudder, as may be required.

3. The combination, with a steam steering-engine and a hand steering-gear, of a brake to assist in holding the rudder, as may be required.

FREDERICK ELLSWORTH SICKELS.

Witnesses:
A. B. STOUGHTON,
EDMUND MASSON.